United States Patent [19]

Ibenthal

[11] Patent Number: 5,903,678
[45] Date of Patent: May 11, 1999

[54] METHODS OF DETERMINING SCALING FACTORS FOR FRACTAL IMAGE CODING

[75] Inventor: Achim Ibenthal, Elmshorn, Germany

[73] Assignee: U.S. Philips Corporation, New York, N.Y.

[21] Appl. No.: 08/960,391

[22] Filed: Oct. 29, 1997

[30] Foreign Application Priority Data

Nov. 20, 1996 [DE] Germany ............................ 196 48 017

[51] Int. Cl.⁶ .............................. G06K 9/36; G06K 9/46
[52] U.S. Cl. .......................... 382/249; 382/248; 382/280
[58] Field of Search .................................... 382/249, 248, 382/280

[56] References Cited

U.S. PATENT DOCUMENTS 5,497,435  3/1996  Berger ...................................... 382/249

OTHER PUBLICATIONS

"Fourier Domain Measurement of Geometrical Scaling and Rotation Factors for Fractal Image Coding and Motion Compensated Prediction", By A. Ibenthal, Picture Coding Symposium 97, Berlin, Germany Sep. 10–12, 1998.

*Primary Examiner*—Phuoc Tran
*Assistant Examiner*—Jimmy D. Nguyen
*Attorney, Agent, or Firm*—Laurie E. Gathman

[57] ABSTRACT

For fractal image coding optimal scaling factors for the image contents in the domain blocks are searched. Each image is divided into analysis blocks, which jointly represent the whole image. The analysis blocks are embedded in analysis regions, which contain besides the analysis blocks areas with a predetermined signal value. Also, comparison regions are formed, which contain at least parts of the image and which have the same size as the analysis regions. The analysis regions and the comparison regions are Fourier transformed. The transformed signals are converted logarithmically. The logarithmized signals are again Fourier-transformed. One of these signals is converted in its conjugate-complex form before both signals are multiplied. The product is normalized, so that it no longer contains amplitude information. Then the signal is subjected to an inverse Fourier-Transformation. If the signal has been logarithmized then it is de-logarithmized. The maximum of this signal then indicates the optimum frequency factors. By a further inverse Fourier-transformation the maximum of the signal indicates the optimal scaling factor that is searched.

8 Claims, 3 Drawing Sheets

METHODS OF DETERMINING SCALING FACTORS FOR FRACTAL IMAGE CODING

BACKGROUND OF THE INVENTION

The invention relates to a method of determining scaling factors for fractal image coding, in which image areas of one or more images are searched for image coding, which image areas are imageable on other image areas with a minimal deviation while using the scaling factors and a corresponding geometric scaling.

In fractal image coding, as described, for example in the article "Fractal Image Coding and Magnification using Invariant Moments" by D. Götting, A. Ibenthal and R. Grigat, Nato Advance Study Institute on Fractal Image Encoding and Analysis, Trondheim, 1995, an image coding of the contents of the image is performed by dividing the image into range blocks which do not overlap and represent the complete image contents. Furthermore, the image is divided into domain blocks which comprise parts of the image contents, preferably also in a transformed form. For each range block, that domain block is searched which is imageable on the relevant range block with the smallest deviation as far as image contents are concerned. The domain blocks comprise the image contents of the original image generally in a reduced form. A factor of 2 is customary. Although this factor has proved to be favorable for implementing the method, it may not always be the optimum factor.

For an optimum coding it is, however, advantageous to find the optimum reduction factor of the image contents in the domain blocks. Prior-art methods which would provide this possibility are not known.

In the prior art, the only possibility is to try out several reduction factors for the image contents in the domain blocks by performing the complete fractal image coding at different scaling factors and by subsequently checking the result on quality. It will be evident that this procedure leads to elaborate computations because it requires an image to be encoded many times to yield the optimum coding.

SUMMARY OF THE INVENTION

It is an object of the invention to provide a method of indicating the scaling factors, yielding the most favorable scaling factors before performing the method of fractal image coding.

According to the invention, this object is solved in that each image is divided into analysis blocks which do not overlap and jointly comprise the complete image contents, analysis regions are generated, each comprising an analysis block which is smaller than the analysis region, while the rest of the analysis region is filled up with a predetermined signal value, comparison regions are generated which have the same size as the analysis regions and comprise at least parts of the image contents, preferably also in a transformed form, the image data of the analysis regions and the comparison regions are subjected to a Fourier transform, the absolute value is formed from the two transformed signals and the local scaling of the signals is logarithmically converted in at least one co-ordinate direction, the signals locally and logarithmically converted in at least one co-ordinate direction are once more subjected to a Fourier transform, a conjugate-complex signal is formed from one of these two signals and multiplied by the other signal, this product is normalized at a predetermined amplitude, the normalized signal is subjected to an inverse Fourier transform, for each analysis region, the maximum of this retransformed signal is determined which, after delogarithmation of the logarithmated scaling of at least one of the co-ordinates, indicates the optimum frequency factors, and the reciprocal values of the frequency factors are formed, representing the searched scaling factors which, when used, enable an area of the comparison region to be imaged on the analysis block with the minimal deviation.

To determine the optimum scaling factors, each image is divided into analysis blocks which jointly represent the complete image contents and do not overlap each other. These analysis blocks are embedded in analysis regions. Each analysis region comprises an analysis block. Each analysis region not only comprises the analysis block but also an area which is filled up with a fixed predetermined signal value; these areas thus do not comprise any actual image information.

Furthermore, comparison regions are generated which have the same size as the analysis regions. These comparison regions comprise at least parts of the image contents, preferably also in a transformed form.

Both the image data of the analysis regions and those of the comparison regions are subjected to a Fourier transform. The data of the local range are thereby converted into the frequency range. The local-discrete amplitudes of the signals are subjected to an absolute value formation. This scaling of at least one of the co-ordinates is converted logarithmically. This is understood to mean that the scanning values which are initially equidistant to each other in one co-ordinate direction are converted in at least one co-ordinate direction on a logarithmic raster. This raster is subsequently scanned equidistantly so that the end effect is that there will be a logarithmic distortion in the scaling of these co-ordinates.

The signals which are logarithmated at least with reference to a co-ordinate or a co-ordinate direction are subjected to a further Fourier transform. The signals thus once again transformed are multiplied, while one signal is converted in advance into its conjugate-complex signal.

The product is normalized at a predetermined amplitude so that the signal no longer comprises any amplitude information. The information is now only present in a phase modulation of the signal. The signal thus normalized is subjected to an inverse Fourier transform and the maximum value of the signal thus retransformed is determined. This is done individually for each analysis block or for each analysis region. In so far as they were logarithmically converted in advance, the co-ordinate directions are subsequently delogarithmated again. After forming the reciprocal values for each area of the comparison region, the signal then generated indicates those scaling factors which, when used, enable each area of the comparison region to be imaged on the associated analysis block with the minimal deviation.

It is then known for each analysis block which scaling factors are usable for all areas of the domain blocks so as to be imageable on the analysis block with a minimal deviation. These scaling factors may be used individually for each analysis block, but it is alternatively possible to provide common scaling factors for all blocks of an image.

The invention is useful in that offsets in the frequency range due to a phase shift are manifest without any influence on the amplitude. The phase is eliminated by forming the absolute value. The amplitude then remains, which is thus shift-invariant. The logarithmic conversion in at least one co-ordinate and the attendant scale distortion have the effect that scaling differences change to offsets. Since it holds that $\log(s \cdot x) = \log(s) + \log(x)$, in which x is the local co-ordinate and s is an expansion or compression, $\log(s)$ may be considered to be an offset with respect to the position $\log(x)$. The offset $\log(s)$ is then determined by means of the method according to the invention.

In a method of fractal image coding, which then follows, it can be determined for range blocks having a form which is, for example identical to that of the analysis blocks, which scaling factors are optimally usable for the regions of the image contents. The actual selection of the domain blocks and hence the coding of the image is reserved for this subsequent method. However, the method according to the invention supplies the optimum scaling factors in advance, which factors, when used, enable regions of the image contents representing domain regions or domain blocks in the fractal image coding to be imaged on the relevant range blocks.

The method according to the invention thus provides the conditions for a subsequent fractal image coding in which the optimum scaling factors are used. In the fractal image coding method itself, only the optimum domain blocks or domain regions can be found for each range block.

In accordance with an embodiment of the invention, the position of the pixels in the analysis blocks and the comparison blocks is indicated by means of cartesian co-ordinates x and y, the scalings of the two co-ordinates are logarithmated after forming the absolute value, the two co-ordinates are delogarithmated after the inverse Fourier transform, and scaling factors $x_v$ and $y_v$ are determined by means of the method, which scaling factors indicate the optimum scale adaptation in the x and y directions and, when used, enable an area of the comparison region to be imaged on the analysis block with the minimal deviation.

A division of the position of the pixels within the analysis blocks and the comparison blocks by means of cartesian co-ordinates x and y is customary. When these co-ordinates are chosen, both co-ordinates should be logarithmated after the absolute value formation and delogarithmated after the inverse Fourier transform. The method according to the invention then supplies separate scaling factors $x_v$ and $y_v$ after the absolute value formation, which factors indicate the optimum scale adaptation in the x and y directions, respectively. The method according to the invention thus supplies separately determined, optimum scaling factors for the x and y directions when using the cartesian co-ordinates.

For using polar co-ordinates to indicate the position of the pixels in the analysis blocks and the comparison blocks, a further embodiment of the invention is characterized in that the position of the pixels in the analysis blocks and the comparison blocks is indicated by means of polar co-ordinates having a radius r and an angle $\phi$, the r co-ordinate is logarithmated after forming the absolute value, the r co-ordinate is delogarithmated after the inverse Fourier transform, and scaling factors $r_v$ and $\phi_v$ are determined by means of the method, which scaling factors indicate the optimum scale adaptation as regards radius r and angle $\phi$ and, when used, enable an area of the comparison region to be imaged on the analysis block with the minimal deviation.

When using polar co-ordinates, in which r is the radius and $\phi$ is the angle, only the r co-ordinate is logarithmated. Then an invariance with respect to the size of an object is achieved. By converting the locations of the amounts of spectral information in a polar co-ordinate system, rotations change to offsets. After delogarithmation of the r values and after performing the method, this yields the radius r and the angle $\phi$ for each range region which, when used, enable a region of the image (comparison region) to be imaged on the analysis block with the smallest deviation as regards image contents.

When using this polar co-ordinate system in the method according to the invention, both a corresponding adaptation of the size of the image contents and that of the angle at which it is arranged in the image can be performed.

In contrast to the use of cartesian co-ordinates, a rotation can also be determined but then a separate determination of the scaling factors for the x and y directions is no longer possible.

In a further embodiment of the invention, the comparison regions advantageously comprise the complete contents of an image and its image contents in a transformed form, preferably in a 90° or 270° rotated and/or mirrored form. In a search process of the method, the optimum scaling factors can then be determined for all regions of the image in the original form as well as in the transformed form for each analysis block.

As already explained hereinbefore, the method yields the optimum scaling factors which can be used for a subsequent fractal image coding operation. The mode of the subsequent fractal image coding is basically arbitrary.

For example, a further embodiment of the invention is characterized in that the scaling factors found are used in a method of fractal image coding, in which each image is divided into range blocks which do not overlap and jointly comprise the complete image contents, domain blocks are generated which have the same size as the range blocks and, in accordance with the scaling factors, comprise geometrically scaled parts of the image contents, and for each range block, that domain block is searched which is imageable on the range block with the minimal deviation as regards image contents.

In this known method, the image subjected to fractal image coding is divided into range blocks and domain blocks, in which the domain blocks have a fixed block size and a fixed position within a block raster in the image. In this method, that domain block is searched for each range block which is imageable on the range block with the smallest deviation as regards image contents. The method according to the invention supplies the optimum scaling factors in advance. This leads to an improvement of the coding results.

As is provided by a further embodiment of the invention, the method according to the invention can also be used with another method in which the scaling factors found are used in a method of fractal image coding, in which each image is divided into range blocks which do not overlap and jointly comprise the complete image contents, range regions are generated, each comprising a range block which is smaller than the range region concerned, and the rest of the range region is filled up with a predetermined signal value, domain regions are generated which have the same size as the range regions and comprise at least parts of the image contents, preferably also in a transformed form, which are geometrically scaled in accordance with the scaling factors, the image data of the range regions and the domain regions are subjected to a Fourier transform, a conjugate-complex signal is formed from one of the two transformed signals and multiplied by the other signal, this product is normalized at a predetermined amplitude, the normalized signal is subjected to an inverse Fourier transform, and for each range region, the maximum value of this retransformed signal is determined, indicating, within a domain region, the position of that domain block whose image contents best approximate the image contents of the range region.

In this method, the range blocks are embedded in range regions. These range regions are larger than the range blocks. Furthermore, domain regions are generated which have the same size as the range regions and comprise at least parts of the image contents, preferably also in a transformed form. These regions are geometrically scaled in accordance with the scaling factors supplied by the method according to the invention.

In this method of fractal image coding, the image data of the range regions and the domain regions are subjected to a Fourier transform, one of the transformed signals is converted into a conjugate-complex signal which is multiplied by the non-converted signal, and the product is normalized at a predetermined amplitude. The normalized signal is again subjected to an inverse Fourier transform and is thus converted from the frequency range to the local range again.

By evaluating this signal, that region within a domain region which, with respect to its image contents, is imageable on the range region and the range block with the smallest deviation can be determined for each range region.

This method of fractal image coding particularly has the advantages that it is performed with fewer computations than the previously mentioned method and the domain blocks within the domain regions do not have a fixed block division. Instead, that region which is optimally imageable on the relevant range block is found within the domain regions. In principle, the division of these ranges found, which may also be denoted as domain regions in this case, is arbitrary, i.e. each domain block may have an arbitrary arrangement and size within the image.

These and other aspects of the invention are apparent from and will be elucidated with reference to the embodiments described hereinafter.

DETAILED DESCRIPTION OF THE PREFERRED EMBODIMENTS

Figure 1:
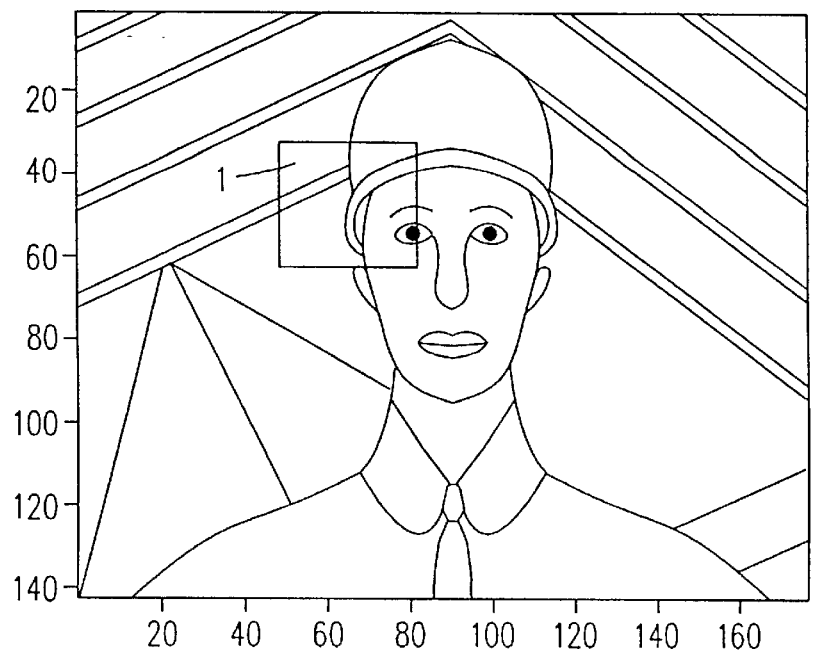
FIG. 1 shows an image for which the optimum scaling factors are to be determined and which includes an example for an analysis block.

FIG. 1 shows an image which is to be subjected to fractal image coding. In fractal image coding, the image is divided into range blocks which cover the complete image contents of the image and do not overlap. Furthermore, domain regions are generated which comprise parts of the image contents, preferably also in a transformed form. The above-mentioned methods of fractal image coding may be used for this purpose, which methods operate with either a fixed or a variable block division.

In either case, the quality of the result of fractal image coding is decisively influenced by finding the optimum scaling factors, generally reduction factors, for the most reduced regions of the image contents within the domain blocks.

These scaling factors may be determined in accordance with the inventive method, to be described hereinafter, either for each range block individually or for a whole image.

In accordance with the inventive method, analysis blocks are generated. These analysis blocks, which may register with the range blocks of the subsequently used method of fractal image coding, represent parts of the image contents, do not overlap and jointly cover the complete image.

FIG. 1 shows image contents with a worker wearing a helmet in front of a building. FIG. 1 shows, by way of example, an analysis block 1. The analysis block has 30 pixels in the horizontal and vertical directions. It represents a part of the image which has a total number of 176 pixels in the horizontal direction and 144 pixels in the vertical direction. Similarly as the analysis block shown in FIG. 1, further blocks are generated which jointly represent the complete image contents.

Figure 2:
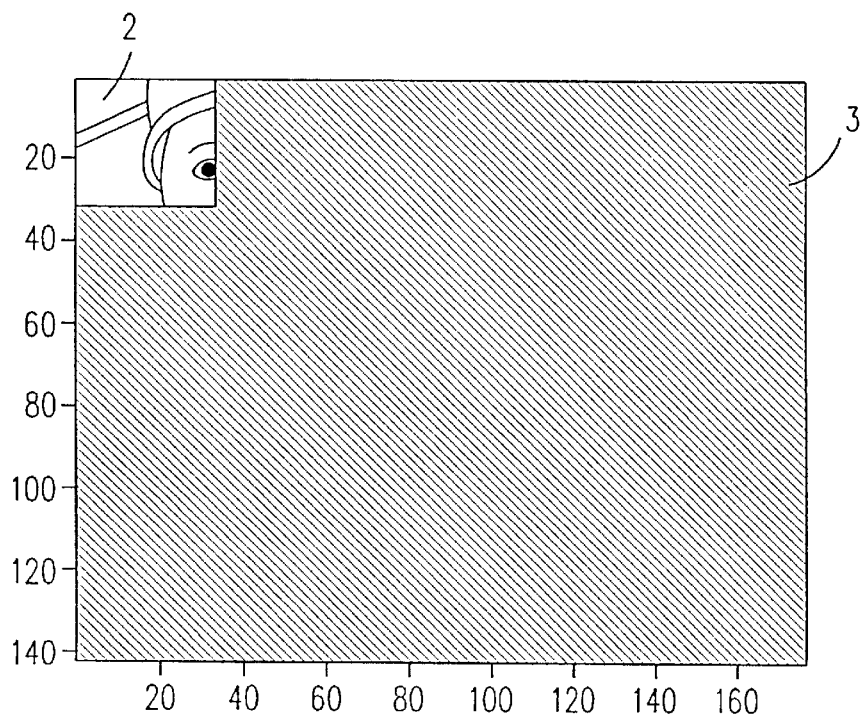
FIG. 2 shows an analysis region including the analysis block of FIG. 1.

FIG. 2 shows how an analysis block is embedded in an analysis region. In FIG. 2, an analysis block 2 is shown which corresponds to the analysis block 1 of FIG. 1. This analysis block is surrounded by an area 3 having a fixed signal value. This signal value does not vary within the analysis region and is predeterminable as regards its height. For performing the method according to the invention, comparison regions should further be generated. These comparison regions preferably represent the complete image contents. Moreover, they may also comprise the image contents in a transformed form.

Figure 3:
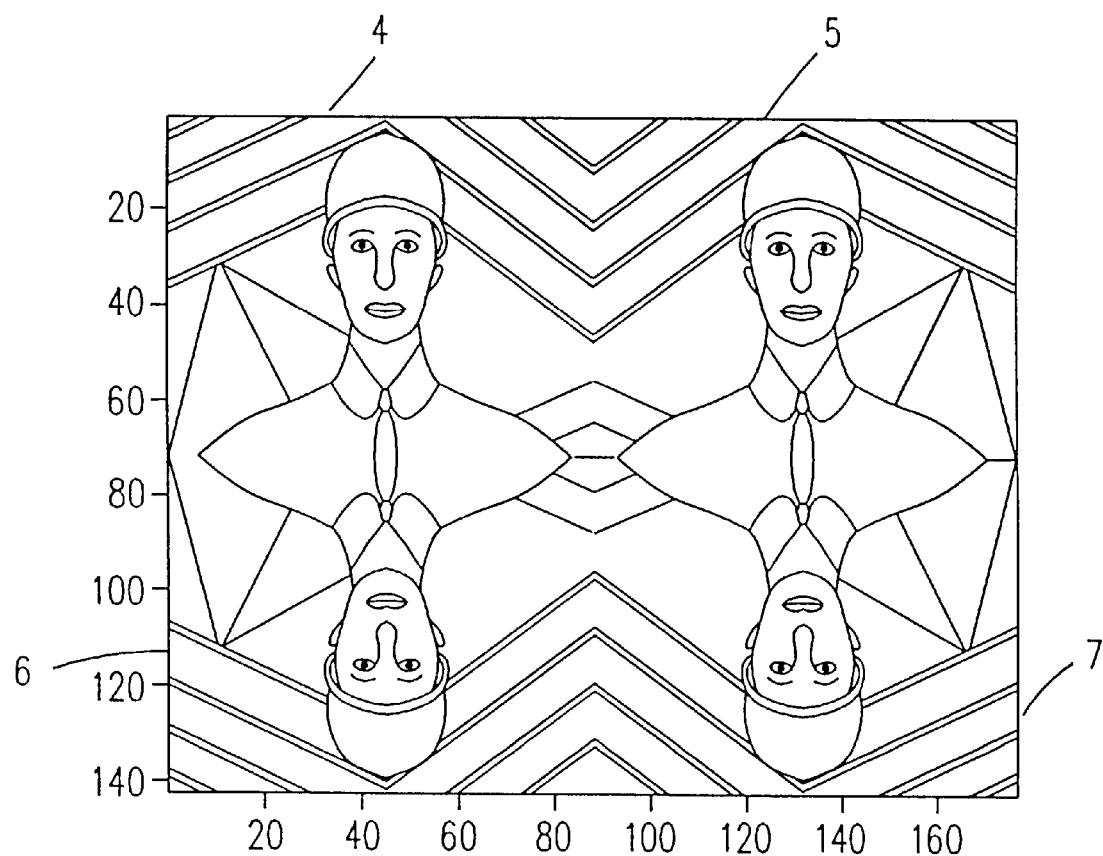
FIG. 3 shows a comparison region comprising the image contents of the image of FIG. 1 in the original, but also transformed form.

FIG. 3 shows such an example of a comparison region. The comparison region in FIG. 3 comprises a partial region 4 which represents the complete image contents of the original image of FIG. 1. The region 5 shows the mirror image of the region 4 in the horizontal direction; a region 6 shows the mirror image in the vertical direction. The partial region 7 shows the 180° rotation of the original image contents of the partial region 4.

The image contents comprised in the analysis and comparison regions have similarities. These similarities may occur at different positions in both regions and, moreover, in different geometrical scales, i.e. in a larger or smaller form as well as at different angles of rotation.

Since the method should determine the optimum scaling factors and angles of rotation independently of the offset, a representation of the image contents must be found which is not dependent on the position of the image contents themselves, i.e. it should be shift-invariant. This is achieved in the method according to the invention in that analysis and comparison regions are subjected to a Fourier transform. Offsets become manifest in the frequency range by a phase shift, without any influence on the amplitude. The phase is eliminated by the absolute value formation and what remains is the amplitude which is thus shift-invariant. The further determination of scaling and rotation factors is thus no longer dependent on offsets within the original image areas.

A subsequent logarithmic scale distortion has the result that scaling differences change to offsets in accordance with the law for the logarithm log($s_x \cdot x$)=log($s_x$)+log(x), in which x is the horizontal local co-ordinate of the Fourier-transformed signal and $s_x$ is the expansion or compression thereof. Now, log($s_x$) can be considered as an offset with respect to the position log(x). In the case of a representation in a cartesian system of co-ordinates, both co-ordinates x and y can be logarithmated. According to the invention, the offsets log($s_x$) and log($s_y$) are then determined by means of a phase correlation which supplies a maximum at the logarithmated position of the optimum scaling factors. To determine those of $s_x$ and $s_y$, only a delogarithmation operation should be performed.

Figure 4:
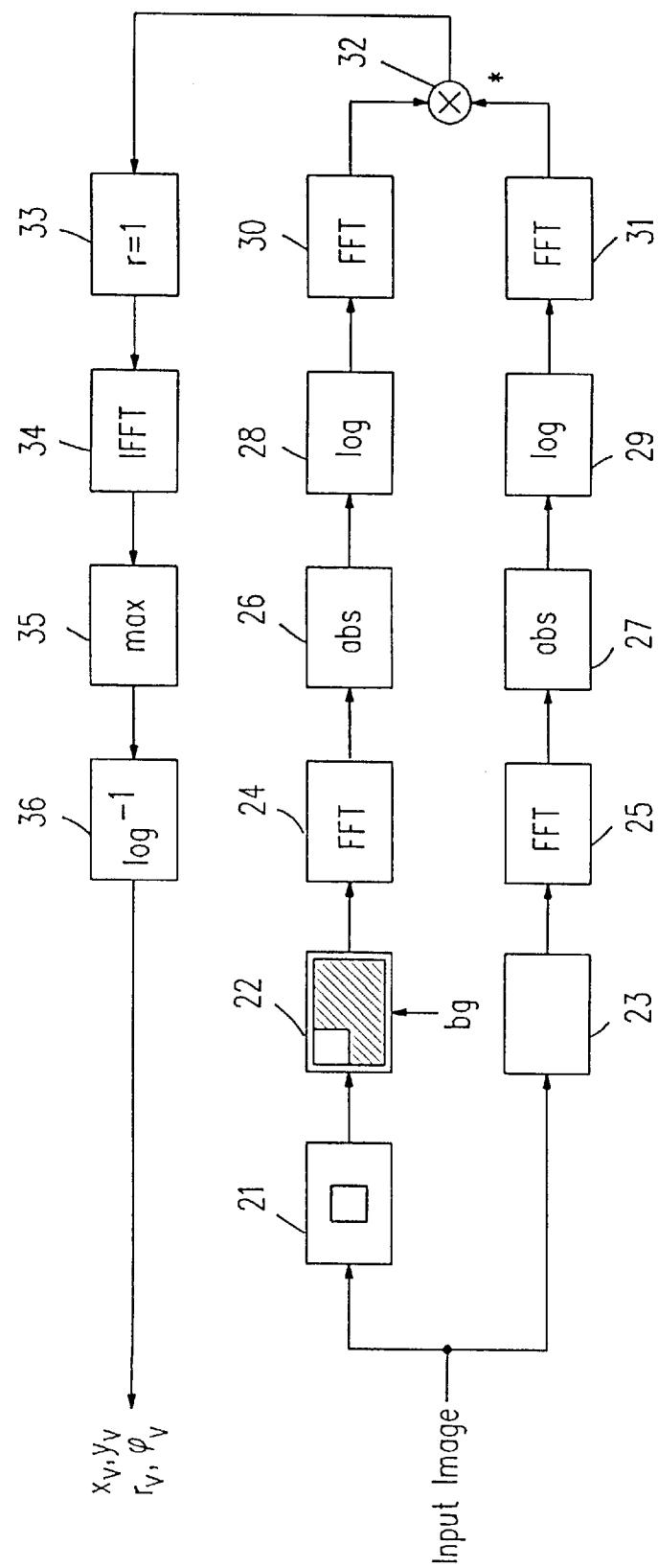
FIG. 4 is a block diagram of an arrangement for performing the method according to the invention.

This will be further described with reference to FIG. 4, showing a block diagram of an arrangement for performing the method according to the invention.

The arrangement shown in FIG. 4 receives an input image with its image data. These are denoted as "Input Image" in the Figure. The data are applied to means 21 for forming analysis blocks, which means precede means 22 for forming analysis regions. The means 22 supply, for example, an analysis region as shown in FIG. 2 at the output.

The input data are further applied to means 23 for generating the comparison regions, which means generate, for example a comparison region as shown in FIG. 3. The means 23 then preferably generate transforms of the image applied thereto.

The means 22 and 23 precede means 24 and 25, respectively, for Fourier transform, which means convert the signals applied thereto from the local range to the frequency range. The means 24 and 25 precede absolute value formers 26 and 27, respectively, whose output signals are applied to means for logarithmic co-ordinate transform, or "logarithmators", 28 and 29 preceding means 30 and 31, respectively, for Fourier transform.

When cartesian co-ordinates are chosen for indicating the pixels within the analysis regions and the comparison regions, both the x and the y co-ordinates are logarithmated by means of the logarithmators 28 and 29, respectively.

When choosing a polar co-ordinate system for indicating the position of the image data, only the radius co-ordinate r is logarithmated in the logarithmators 28 and 29.

The means 30 and 31 having one of the output signals converted into its conjugate-complex signal, precede a multiplier 32 which multiplies the converted signal by the relevant other, non-converted signal.

The multiplier 32 precedes a normalizer 33 which normalizes the amplitude of the signal at a value equal to 1. The normalized signal is retransformed with the aid of means 34 for inverse Fourier transform, which means precede a maximum value detector 35. The co-ordinates of the maximum value found are delogarithmated with the aid of means 36. In the case of cartesian co-ordinates, both co-ordinate directions x and y are delogarithmated, and in the case of polar co-ordinates, only the co-ordinate r is delogarithmated. The reciprocal values are formed, representing the searched scaling factors.

The output of the arrangement of FIG. 4 supplies the output signal of the means 36 which determine the scaling factors $x_v$, $y_v$ or $r_v$, $\phi_v$ generated by the means 21 for the analysis block or by the means 22 for the analysis region, respectively. When used, these scaling factors enable an area of the comparison region generated by the means 23 to be imaged on the analysis block or the analysis region with a minimal deviation as regards image contents.

To perform a fractal image coding operation, the arrangement of FIG. 4 may precede a further arrangement which performs the actual fractal image coding operation and uses the scaling factors supplied by the arrangement of FIG. 4.

It is then known in advance which optimum scaling factors are to be used for the actual fractal image coding operation. As compared with the prior art, the fractal image coding result is thereby optimized.

I claim:

1. A method of determining scaling factors for fractal image coding, in which image areas of one or more images are searched for image coding, which image areas are imageable on other image areas with a minimal deviation while using the scaling factors and a corresponding geometric scaling, characterized in that each image is divided into analysis blocks which do not overlap and jointly comprise the complete image contents, analysis regions are generated, each comprising an analysis block which is smaller than the analysis region, while the rest of the analysis region is filled up with a predetermined signal value, comparison regions are generated which have the same size as the analysis regions and comprise at least parts of the image contents, preferably also in a transformed form, the image data of the analysis regions and the comparison regions are subjected to a Fourier transform, the absolute value is formed from the two transformed signals and the local scaling of the signals is logarithmically converted in at least one co-ordinate direction, the signals locally and logarithmically converted in at least one co-ordinate direction are once more subjected to a Fourier transform, a conjugate-complex signal is formed from one of these two signals and multiplied by the other signal, this product is normalized at a predetermined amplitude, the normalized signal is subjected to an inverse Fourier transform, for each analysis region, the maximum of this retransformed signal is determined which, after delogarithmation of the logarithmated scaling of at least one of the co-ordinates, indicates the optimum frequency factors, and the reciprocal values of the frequency factors are formed, representing the searched scaling factors which, when used, enable an area of the comparison region to be imaged on the analysis block with the minimal deviation.

2. A method as claimed in claim 1, characterized in that the position of the pixels in the analysis blocks and the comparison blocks is indicated by means of cartesian co-ordinates x and y, the scalings of the two co-ordinates are logarithmated after forming the absolute value, the two co-ordinates are delogarithmated after the inverse Fourier transform, and scaling factors $x_v$ and $y_v$ are determined by means of the method, which scaling factors indicate the optimum scale adaptation in the x and y directions and, when used, enable an area of the comparison region to be imaged on the analysis block with the minimal deviation.

3. A method as claimed in claim 1, characterized in that the position of the pixels in the analysis blocks and the comparison blocks is indicated by means of polar co-ordinates having a radius r and an angle $\phi$, the r co-ordinate is logarithmated after forming the absolute value, the r co-ordinate is delogarithmated after the inverse Fourier transform, and scaling factors $r_v$ and $\phi_v$ are determined by means of the method, which scaling factors indicate the optimum scale adaptation as regards radius r and angle φ and, when used, enable an area of the comparison region to be imaged on the analysis block with the minimal deviation.

4. A method as claimed in claim 1, characterized in that the comparison regions comprise the complete contents of an image.

5. A method as claimed in claim 1, characterized in that the comparison regions comprise the complete contents of an image and its image contents in a transformed form, preferably in a 90° or 270° rotated and/or mirrored form.

6. A method as claimed in claim 1, characterized in that the scaling factors found are used in a method of fractal image coding, in which each image is divided into range blocks which do not overlap and jointly comprise the complete image contents, domain blocks are generated which have the same size as the range blocks and, in accordance with the scaling factors, comprise geometrically scaled parts of the image contents, and for each range block, that domain block is searched which is imageable on the range block with the minimal deviation as regards image contents.

7. A method as claimed in claim 1, characterized in that the scaling factors found are used in a method of fractal image coding, in which each image is divided into range blocks which do not overlap and jointly comprise the complete image contents, range regions are generated, each comprising a range block which is smaller than the range region concerned, and the rest of the range region is filled up with a predetermined signal value, domain regions are generated which have the same size as the range regions and comprise at least parts of the image contents, preferably also in a transformed form, which are geometrically scaled in accordance with the scaling factors, the image data of the range regions and the domain regions are subjected to a Fourier transform, a conjugate-complex signal is formed from one of the two transformed signals and multiplied by the other signal, this product is normalized at a predetermined amplitude, the normalized signal is subjected to an inverse Fourier transform, and for each range region, the maximum value of this retransformed signal is determined, indicating, within a domain region, the position of that domain block whose image contents best approximate the image contents of the range region.

8. An encoder for performing the method as claimed claim 1, characterized in that the encoder comprises means (21) for forming analysis blocks, which means receive the image signal and precede means (22) for forming analysis regions, means (23) for generating comparison regions, which means receive the image signal, the means (22; 23) for forming analysis blocks and comparison blocks preceding means (24; 25) for Fourier transform whose output signals are applied to absolute value formers (26; 27) preceding means (28; 29) for logarithmic co-ordinate transform, or logarithmators, which logarithmate at least one co-ordinate of the signals applied thereto, the logarithmators (28; 29) preceding means (30; 31) for Fourier transform having one of the output signals converted into its conjugate-complex signal which is multiplied by the non-converted signal of the other means for Fourier transform by means of a multiplier (32) whose output signal is applied to means (33) for normalizing the amplitude and which precedes means (34) for performing the inverse Fourier transform in which the maximum amplitude of its output signal is determined by means of a maximum value detector (35) and whose co-ordinates logarithmated in advance are delogarithmated by means of a delogarithmator (36) whose output signal, after formation of the reciprocal value, indicates the optimum scaling factors for the comparison regions with reference to an analysis region.

* * * * *